United States Patent [19]

Stanley

[11] Patent Number: 5,084,779
[45] Date of Patent: Jan. 28, 1992

[54] TRANSMITTER AND TRANSCEIVER FOR A COHERENT OPTICAL SYSTEM

[75] Inventor: Ian W. Stanley, Ipswich, England

[73] Assignee: British Telecommunications public limited company, London, England

[21] Appl. No.: 288,253

[22] PCT Filed: Apr. 14, 1988

[86] PCT No.: PCT/GB88/00290

§ 371 Date: Dec. 15, 1988

§ 102(e) Date: Dec. 15, 1988

[87] PCT Pub. No.: WO88/08231

PCT Pub. Date: Oct. 20, 1988

[30] Foreign Application Priority Data

Apr. 15, 1987 [GB] United Kingdom ............... 8709073

[51] Int. Cl.$^5$ .................................... H04B 10/00
[52] U.S. Cl. .................................... 359/152; 359/154
[58] Field of Search ........... 455/617, 618, 606, 607, 455/619, 616; 370/3, 2

[56] References Cited

U.S. PATENT DOCUMENTS 4,243,942  1/1981  Glass ........................ 372/33
4,879,761 11/1989  Webb ........................ 455/618

FOREIGN PATENT DOCUMENTS 0168192  1/1986  European Pat. Off. .
1487054  7/1966  France .
54-114005 9/1979  Japan ........................ 455/617
59-5757  12/1984  Japan .

OTHER PUBLICATIONS

ICC'80, Conference Record of the International Conference on Communications, 8th-12th Jun. 1980, Seattle, vol. 3, pp. 38.5.1-38.5.5, IEEE, New York, U.S.; T. Iwawo et al.: "On the Commercialization of Optical Fiber Directional Transmission Equipment Using LED and WOM Technique".

Patent Abstracts of Japan, vol. 7, No. 226 (E-202)[1371], 7th Oct. 1983; & JP-A-58 115 948 (Nippon Denki K.K.) 09-07-1983.

IEEE Journal of Quantum Electronics, vol. QE-21, No. 12, Dec. 1985, pp. 1862-1879, IEEE, New York, U.S.; P. S. Henry: "Lightwave Primer".

Patent Abstracts of Japan, vol. 9, No. 84 (E-239) [1521·, 18th Apr. 1984; and JP-A-59 5757 (Nippon Denshin Denwa Kosha).

Patent Abstracts of Japan, vol. 9, No. 190 (P-378)[1913], 7th Aug. 1985; and JP-A-60 57 824 (Fujitsu. K.) -3-04-1985.

Transactions of the I.E.C.E. of Japan, vol. E-67, No. 6, Jun. 1984, pp. 337-338, Tokyo, JP; M. Shikada et al.: "High Sensitivity Optical PSK Heterodyne Differential Detection Simulation Experiments".

Patent Abstracts of Japan, vol. 5, No. 186 (E-84)[858], 25th Nov. 1981; and JP-A-56 112 143 (Tokyo Shibaura Denki K.K.) 04-09-1981.

IEEE Spectrum-May 1984, "Semiconductor Optical Amplifiers" pp. 26-33.

*Primary Examiner*—Curtis Kuntz
*Assistant Examiner*—Kinfe-Michael Negash
*Attorney, Agent, or Firm*—Nixon & Vanderhye

[57] ABSTRACT

In a coherent optical system, a transmitter or transceiver having an optical source which feeds a single coherent wave to both a modulator and a bi-direction amplifier. The modulator generates a modulated information signal and the amplifier generates an unmodulated, amplified reference signal. A coupling means combines the modulated and amplified signals for transmission to a remote detector. The detector uses the amplified signal as the reference optical signal in a homodyne or heterodyne system.

8 Claims, 2 Drawing Sheets

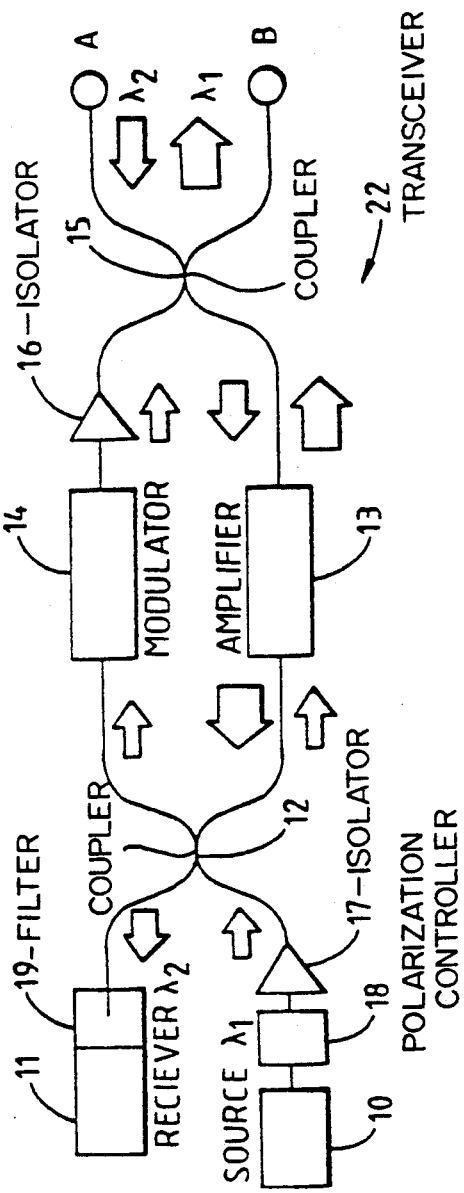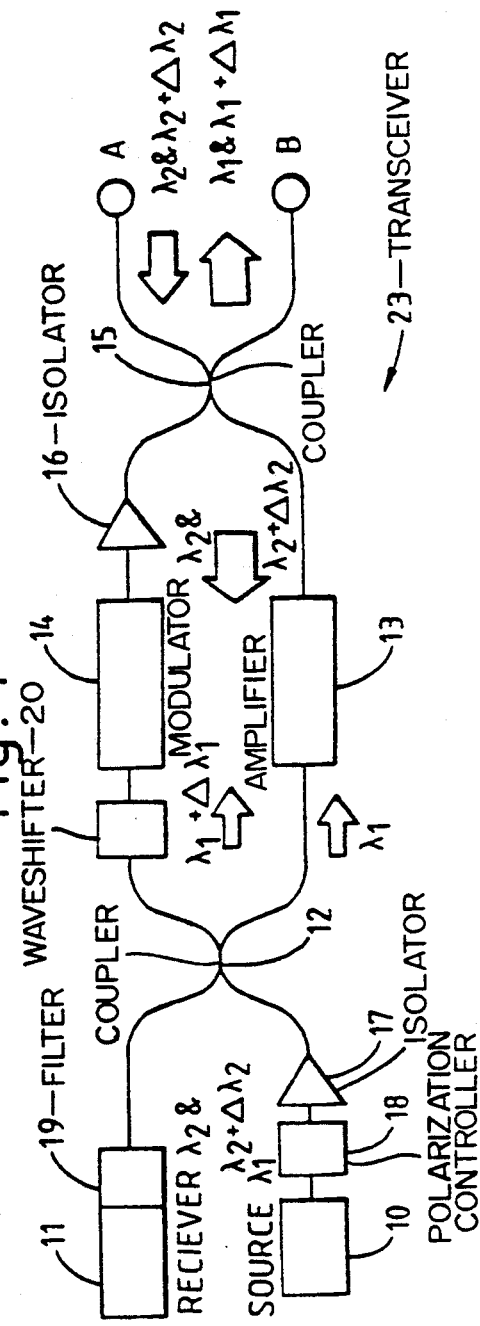

TRANSMITTER AND TRANSCEIVER FOR A COHERENT OPTICAL SYSTEM

BACKGROUND OF THE INVENTION

1. Field of the Invention

The present invention relates to coherent optical systems and in particular a transmitter and transceiver for use in coherent optical systems.

2. Description of Related Art

Any optical system involving the transmission and reception of optical signals must cope with the problems introduced by signal degradation over the transmission medium. Some methods of improving the quality of signal reception are well known. It is recognized, for example, that coherent optical systems, with optical receivers using heterodyne or homodyne techniques in particular, offer a considerable improvement over standard direct intensity systems. Conventionally, such coherent systems require a strong reference signal to be mixed with an incoming modulated signal in a receiver. Generally, this reference signal is provided by a secondary laser, or local oscillator, in the receiver itself. Additionally, for homodyne reception, the reference signal must be precisely phase locked with the incoming modulated signal. With one laser to originate the transmission and another to act as local oscillator, the difficulties involved in achieving this phase locking are severe.

Published European Patent Application EP 168192 A2 discloses a coherent transmission system in which a single laser transmitter is used to provide both modulated and reference signals. Both signals are sent together in orthogonal polarisations. At a receiver, the reference signal is divided off and separately amplified to drive a coherent detector. This system suffers from problems caused by birefringence in the transmission medium (e.g. an optical fibre) which may introduce polarisation dependent phase shifts in the two signals.

SUMMARY OF THE INVENTION

It is an object of the present invention to provide a novel method of operating an optical amplifier to counteract the problems of signal degradation.

It is a further object of the invention to provide novel and improved optical transceiver topologies which avoid or at least mitigate the difficulties mentioned above.

According to a first aspect of the present invention an optical transmitter for use in a coherent optical system comprises a single optical source coupled to a modulating means for generating a modulated information signal and to an optical amplifier to provide an amplified, unmodulated reference signal; and a coupling means for combining the modulated information signal and the amplified, unmodulated reference signal.

A transmitter according to the invention in its first aspect avoids the need for two separate optical sources, one as a transmitter, one as a local oscillator, in coherent systems. Through selective amplification of an unmodulated proportion of the source signal a transceiver according to the invention is able to provide an output signal which itself contains the strong reference signal needed for demodulation of the modulated signal at a remote receiver. Furthermore, since the reference signal and the modulated signal are both derived from the same source the problem of phase locking in homodyne receivers is overcome.

According to a second aspect of the present invention an optical transceiver for use in a coherent optical system comprises an optical transmitter according to the first aspect of the invention, the optical amplifier being adapted to provide bi-directional optical amplification in one direction for the transmitted reference signal and in the other direction both for a received information signal and a received reference signal; and a receiver including a coherent detection receiver coupled to the amplifier for receiving an input signal comprising a modulated information signal and an unmodulated reference signal from a remote transmitter amplified by the amplifier.

The duplex use of the optical amplifier avoids the necessity for a pre-amplifier dedicated to the receiver alone, thereby offering a further reduction in component count and complexity relative to earlier transceivers.

Preferably the amplifier is a travelling wave or other substantially non-resonant amplifier. Preferably also the light travels through the amplifying medium of the amplifier once in each direction.

The wavelengths transmitted by the transmitter and received by the receiver in which both incoming and outgoing signals in an optical system can be amplified without requiring separate amplifiers, for example wavelengths may be, but need not necessarily be, different. So long as the amplifier is driven to amplify the light linearly according to the input amplitude then the light from one path will not substantially interfere with light from another.

Since the light from each path is amplified independently, the light input from both different paths may be amplified simultaneously. The method is therefore particularly appropriate for duplex optical systems.

In a preferred embodiment of the present invention in its second aspect the optical transceiver comprises an optical source for generating a source signal; an optical receiver for receiving an input signal; a bi-directional optical amplifier for amplifying the input signal and a first proportion of the source signal; modulating means for applying a signal modulation to a separate second proportion of the source signal; first optical coupling means for coupling the amplified input signal to the receiver and for coupling the first proportion of the source signal from the source into the amplifier and the second proportion of the source signal from the source into the modulating means; and second optical coupling means for combining the modulated second proportion and the amplified first proportion of the source signal into an output signal and for coupling the input signal into the amplifier.

The transceiver may be adapted for heterodyne operation by including wavelength shifting means for shifting the wavelength of the second proportion of the source signal. The combined output signal then comprises the amplified first proportion of the source signal as reference signal together with a wavelength-shifted, modulated second proportion.

Conveniently, the first coupling means comprises a directional coupler and an optical isolator to prevent any signals coupling back into the source.

Similarly, the second coupling means also conveniently comprises a directional coupler and an optical isolator to prevent the input signal coupling into the modulating means.

Preferably, the optical source comprises a laser and provides a narrow linewidth, single mode coherent source signal.

Preferably also, the optical source is tunable to allow channel selectivity in transmission.

Likewise conveniently the receiver includes filter means to permit local channel selection when the input signal comprises a plurality of channels, for example.

Where a transceiver is one of many forming nodes in an optical network, for instance, the tunability of source and receiver will enable any one transceiver to communicate with any other via an otherwise passive optical network.

BRIEF DESCRIPTION OF THE DRAWINGS

The invention in its various aspects will now be described by way of example and with reference to the accompanying drawings, in which:

FIG. 3 is a schematic of an embodiment of a transceiver according to the invention in its second aspect; and FIG. 4 is a schematic of an alternative embodiment of a transceiver according to the invention in its second aspect.

DESCRIPTION OF THE PREFERRED EMBODIMENTS

Figure 1:
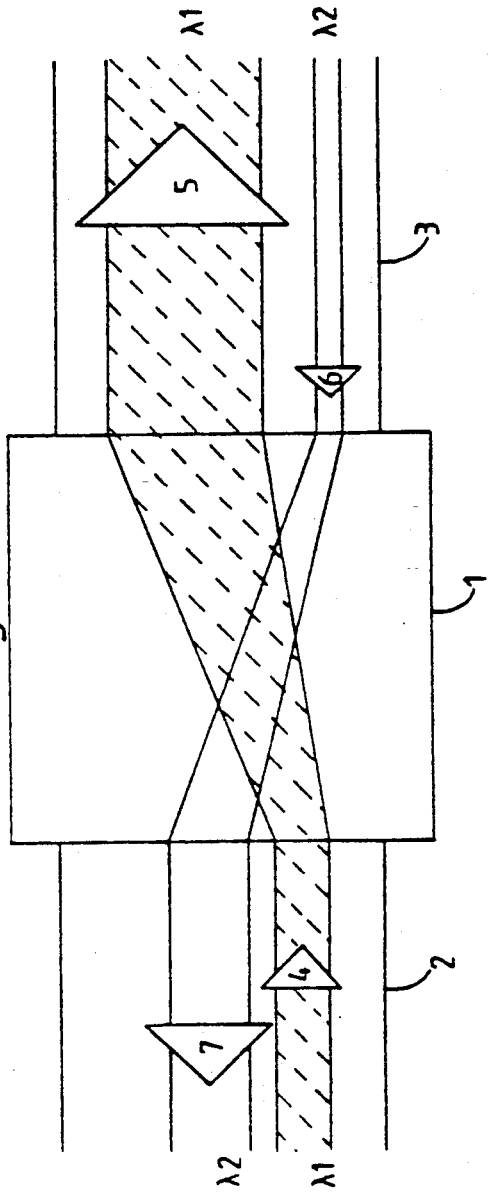
FIG. 1 illustrates the operation of a bi-directional optical amplifier as used in the second aspect of the invention.

In FIG. 1, a travelling wave optical amplifier 1, capable of optically bi-directional operation, is shown connected between two optical transmission paths 2, 3. Two optical signals 4, 6 of wavelengths $\lambda_1$, $\lambda_2$ respectively are injected into the amplifier 1 in optically opposed directions along the paths 2, 3. These signals 4, 6, are then subject to linear amplification in the amplifier and emerge as amplified signals 5, 7 along the paths 3, 2 optically opposed to those along which they were originally injected. (The signals are shown deflected in FIG. 1 for convenience of illustration only). The signals are amplified independently, even when simultaneously present, as the amplification is controlled to be substantially linear. It is also not necessary for the wavelengths $\lambda_1$, $\lambda_2$ to be different.

A travelling wave amplifier 1 as shown, is suitably adapted for bi-directional operation, since the signals make only one pass through the amplifier and the optically opposed exit and entry points are well defined for each signal. However, it will be appreciated that other amplifiers may equally be suitable for use according to the method so long as they fulfill the requirements that the amplification is substantially linear and that the signals transfer between paths after amplification.

The operation of an optical amplifier by the method described facilitates improvements in optical transceiver topology as will be described with reference to FIGS. 3 and 4.

Figure 2:
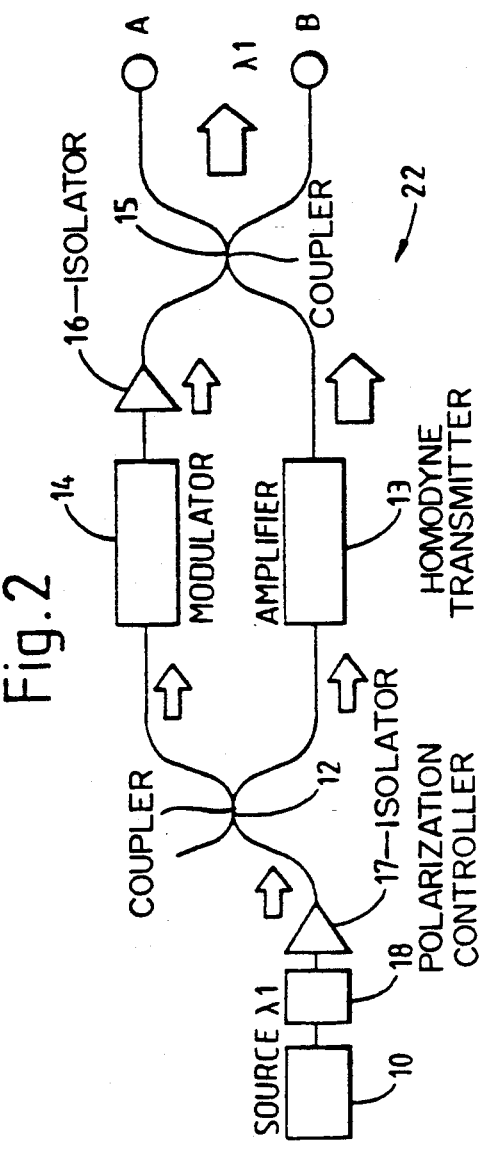
FIG. 2 is a schematic of one embodiment of a transmitter according to the invention in its first aspect.

FIG. 2 illustrates schematically the topology of a homodyne coherent optical transmitter according to the present invention.

The transmitter 22 of FIG. 2 includes a tunable, transmitting laser source 10. A directional coupler 12 connects the laser 10 to a bi-directional optical amplifier 13 and to a modulator 14.

The amplifier 13 and modulator 14 are themselves further coupled via a second directional coupler 15 to the input/output ports A, B of the transmitter.

In operation, the laser 10 is tuned to provide light output at wavelength $\lambda_1$. This light is split by the directional coupler 12, a proportion passing to the modulator 14 whilst the remainder passes amplifier 13.

The modulator 14, in this example, is a polarisation sensitive planar waveguide device of a type known in the art, it is therefore necessary to ensure that light entering the modulator has the appropriate polarisation. For this purpose, a polarisation controller 18 is provided at the output of the laser 10. The position of the polarisation controller 18 is not crucial. It could equally well be placed immediately before the modulator 14, for example, in which case a polarisation controller will be required after the modulator to bring it into the correct polarisation orientation with respect to the amplified reference signal. The modulator 14 imposes the desired modulation on the proportion of light passed to it and passes this modulated light to the second directional coupler 15.

The remainder of the light from the laser 10 is unmodulated. However, this light is amplified in the amplifier 13 before it too is passed to the second directional coupler 15. This coupler 15 combines the modulated and unmodulated but amplified, light signals. The combined signals are then output into an appropriate optical communication network via either or both of the I/O ports A, B.

The output signal therefore comprises an information carrying, modulated portion and an unmodulated, automatically phase locked, amplified portion. The output signal thus contains its own strong homodyne reference for use in demodulating the modulated portion at a remote receiver. Consequently, there is no need for a dedicated local oscillator reference laser at that remote receiver.

Referring now to FIG. 3 there is shown a transceiver 22a according to the second aspect of the present invention in which has been added to the transmitter of FIG. 2 a receiver 11 containing an optical detector coupled to the previously free arm of the coupler 12.

Considering the receive function of the transceiver of FIG. 3, an input signal of wavelength $\lambda_2$, not necessarily the same as $\lambda_1$, arriving via either or both I/O ports A, B is coupled by the second directional coupler 15 into the bi-directional amplifier 13. An optical isolator 16 prevents coupling of any of the input signal into the modulator 14. The amplifier 13 passes the amplified input signal to the receiver 11 via the first directional coupler 12. A second optical isolator 17 prevents any of this signal coupling into the laser 10. The receiver 11 includes a narrow-band optical filter 19 to allow fine tuning of the wavelength selection.

It may be desirable in some circumstances to have a heterodyne transceiver rather than a homodyne transceiver. Heterodyne systems may be more tolerant to imperfections in laser line width and disturbances such as phase-noise, for example.

An embodiment of the invention as a heterodyne transceiver 23 is illustrated in FIG. 4. The components generally correspond with those in FIG. 3 and are numbered accordingly, with one addition. In this embodiment a wavelength shifter 20 is inserted before the modulator 14. The wavelength shifter 20 introduces the necessary intermediate frequency difference for a heterodyne system in the form of a wavelength shift $\Delta\lambda_1$.

Consequently, and as shown, the output signal comprises an amplified, unmodulated reference signal at wavelength $\lambda_1$ together with a modulated signal at shifted wavelength $\lambda_1 + \Delta\lambda_1$. Similarly, the input signal from a remote transceiver comprises a reference signal at wavelength $\lambda_2$ and a modulated signal at wavelength $\lambda_2 + \Delta\lambda_2$. It will be appreciated that, in this embodiment, the receiver 11 is suitably adapted to demodulate the intermediate frequency signal derived from the combined input signal, as in a conventional heterodyne system.

In addition to the benefits from reduced component court and complexity already mentioned, optical transceivers as described above offer considerable advantages in budgeted power gain. A representative budget is:

| | |
|---|---|
| Bi-directional amplifier gain - transmission | +15 dB |
| Bi-directional amplifier gain - reception | +15 dB |
| and, using only output A or B: | |
| Additional coupler losses | −6 dB |
| Excess receiver tuner loss (eg Fabry-Perot) | −1 dB |
| Excess modulator loss | −1dB |
| Additional isolator losses | −2 dB |

This represents a gain of approximately 20 dB by virtue of the bi-directional operation of the amplifier when compared with conventional coherent systems incorporating a single amplifier.

The net additional power budget compared with a conventional homodyne system is therefore in the region of 20 dB. The homodyne technique itself is theoretically capable of about 20 dB improvement over standard direct intensity detection systems, depending on the technique adopted, but in a less than optimum system about 10 dB may be practicable. In this instance, however, it is the combination of duplex working and transmission of the signal and reference oscillator taken together with the local oscillator tuning ability that provides the performance in shorter distance networks. Heterodyne variants of the same arrangement are also possible.

I claim:

1. An optical transmitter for use in a coherent optical system comprising a single optical source coupled to a modulating means for generating a modulated information signal and to an optical amplifier to provide an amplified, unmodulated reference signal, a coupling means for combining said modulated information signal and said amplified, unmodulated reference signal; and a wavelength shifting means for shifting the wavelength of said source signal before modulation thereof by said modulating means.

2. An optical transmitter according to claim 1 wherein said optical source comprises a laser and means for tuning said source signal.

3. An optical transceiver for use in a coherent optical system comprising
    a single optical source coupled to a modulating means providing a transmitted modulated information signal and to an optical amplifier providing a transmitted amplified, unmodulated reference signal;
    said optical amplifier providing bi-directional optical amplification in one direction for said transmitted reference signal and in the other direction both for a received modulated information signal and a received unmodulated reference signal;
    a coupling means for combining said transmitted information signal and said transmitted reference signal; and
    a receiver including a coherent detection receiver coupled to said amplifier for receiving an amplified input signal comprising said received information signal and said received reference signal.

4. An optical transceiver according to claim 3 wherein said coupling means comprises a directional coupler and an optical isolator located between said optical source and said directional coupler so as to prevent any of the source signal coupling back into said optical source.

5. An optical transceiver according to claim 3 further comprising a second coupling means having a second directional coupler and a second optical isolator located between said second directional coupler and said modulating means so as to prevent said input signal coupling into said modulating means.

6. An optical transceiver according to claim 3 wherein said receiver includes a filter means for selecting said input signal from a plurality of signals.

7. An optical transceiver as in claim 3 further comprising a wavelength shifting means for shifting the wavelength of the signal from said optical source before modulation thereof by said modulating means.

8. A coherent optical system having a transceiver;
    said transceiver having an output means for transmitting optical signals having a modulated information component and an amplified, unmodulated reference component, said components being formed from a single input source means of coherent light, said transceiver also including means for receiving optical signals having reference and information components;
    said transceiver further comprising a bidirectional amplifier for generating said amplified unmodulated reference component of the signals to be transmitted and for amplifying said reference and information components of received signals.

* * * * *